April 9, 1963     F. W. HACK     3,084,723
POWER BAND SAW

Filed Oct. 28, 1959     5 Sheets-Sheet 3

Inventor
FRANK W. HACK
Attys.

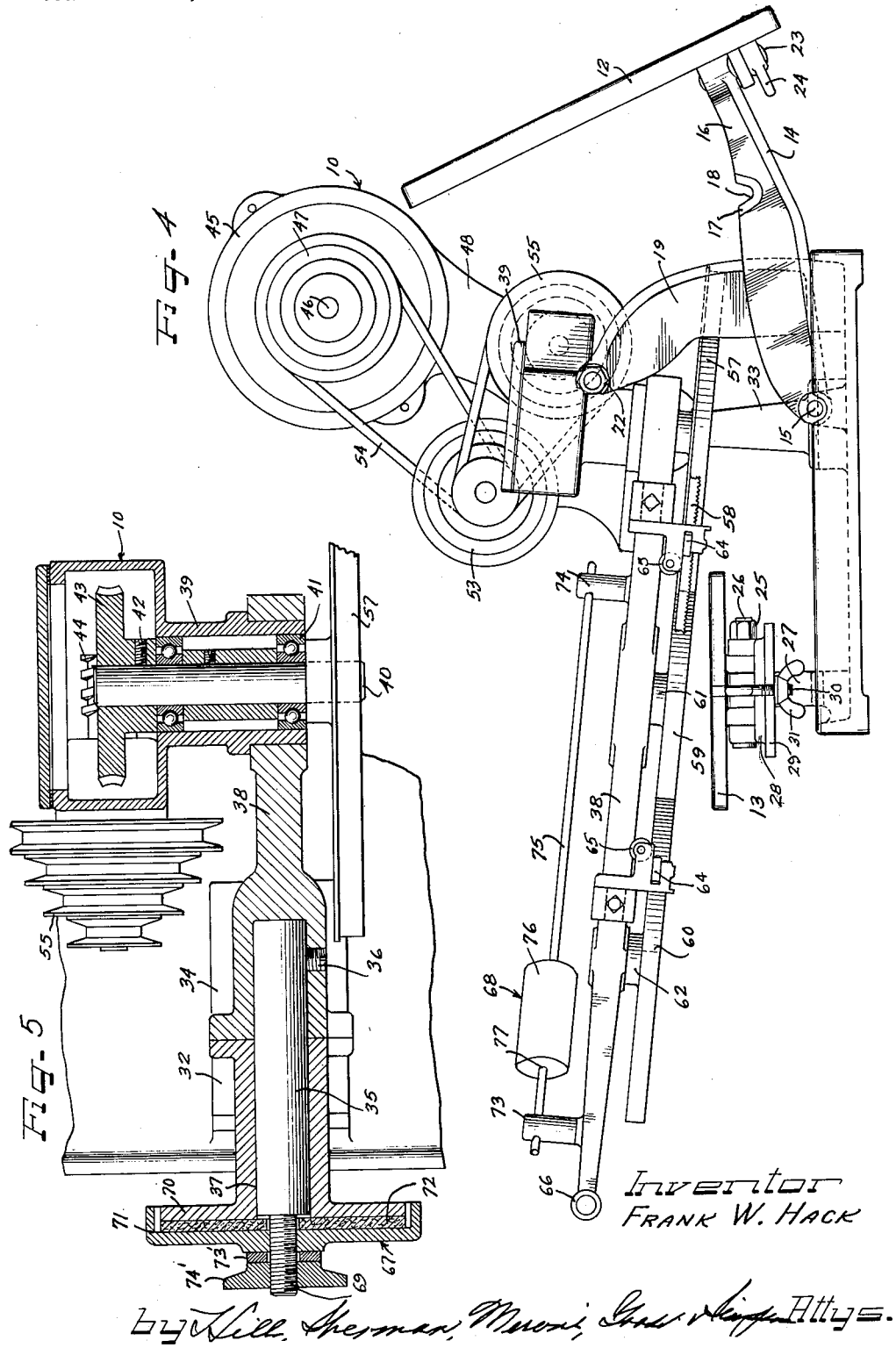

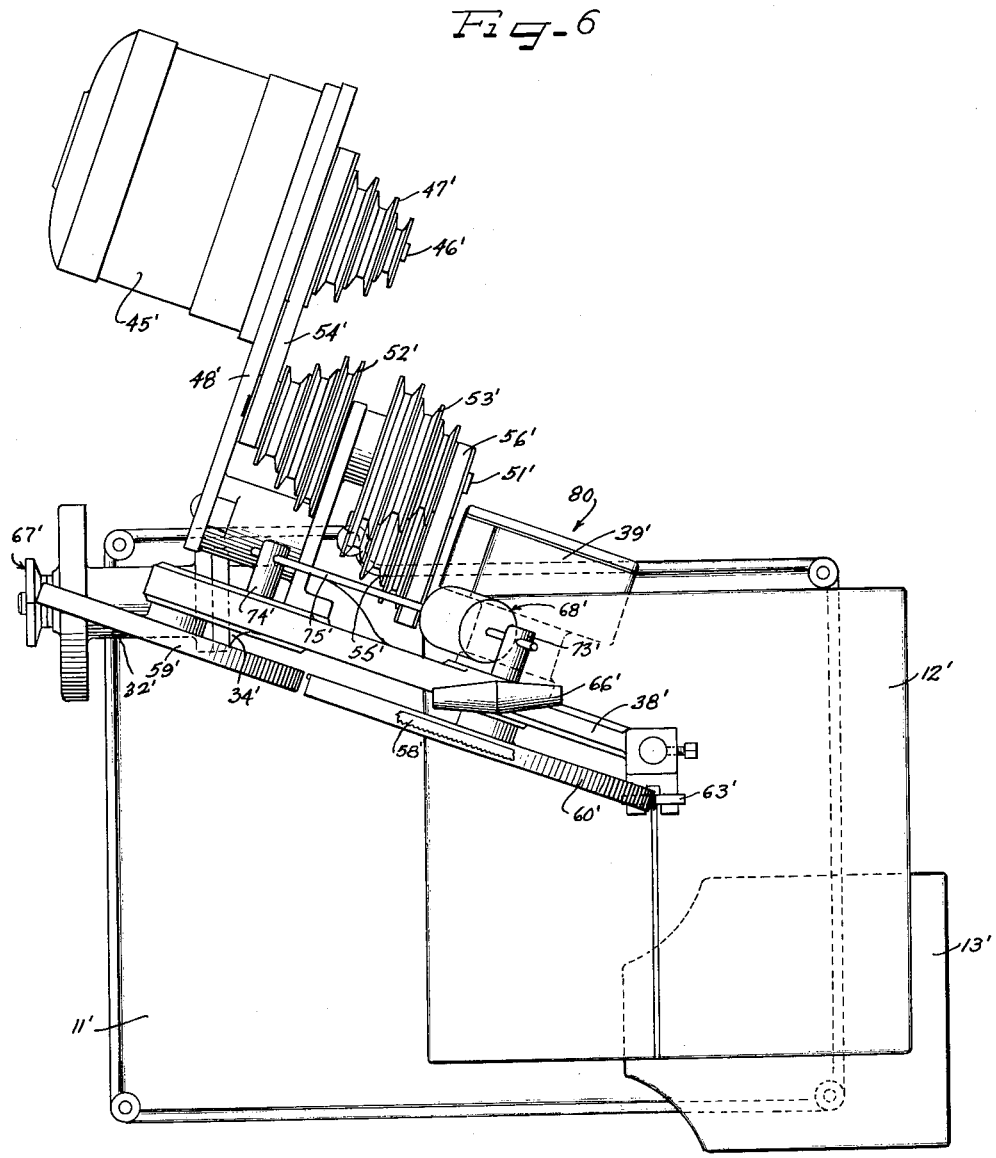

United States Patent Office 3,084,723
Patented Apr. 9, 1963

3,084,723
POWER BAND SAW
Frank W. Hack, 1226–28 Harding Ave., Des Plaines, Ill.
Filed Oct. 28, 1959, Ser. No. 849,361
3 Claims. (Cl. 143—24)

This invention relates generally to a band saw machine and more particularly to a band saw machine having a pivotal portion including the saw blade which may be pivoted to selected positions thereby enabling the machine to be used in an increased number of different type cutting operations than formerly.

The saw blade may be maintained in a generally vertical cutting position relative to the machine for general all around use and is cooperable with an elevated pivotally mounted work table. In addition, the saw blade may be pivoted into a generally horizontal cutting position relative to the machine where a second adjustable work table is provided. When the saw blade is pivoted from a generally vertical position to a generally horizontal position, an adjustable feeding device may be utilized which can be set to enable automatic feeding of the saw blade into the stock to be machined by the saw blade. The present band saw machine is believed to be particularly advantageous in view of its adaptability for different types of cutting operations and because of the ease with which the adjustments may be made to convert the saw blade from a vertical cutting position to a horizontal self-feeding cutting position.

Accordingly, an object of this invention is to provide a new and improved band saw machine having a cutting element which may be pivoted on a pivotal axis from a vertical cutting position to selective cutting positions inclined to the vertical cutting position.

Another object of this invention is to provide a band saw machine which may be optionally automatically fed into the stock of material to be cut when the saw blade is in a position inclined to the vertical position.

Yet another object of this invention is to provide a band saw machine which may be easily adjusted to selective cutting positions to accommodate different job requirements with a minimum loss of time.

Still another object of this invention relates to the provision of a versatile band saw machine which may be used in a greater variety of different type cutting operations thereby increasing the overall value of the machine to its owner since now a single machine may be used to accomplish the work formally handled by two or more individual band saw machines and the like and with a minimum number of adjustments.

A further object of this invention is to provide a band saw machine which lends itself to economical manufacture and yet may be efficiently operated by a single operator with a minimum of adjustment.

A still further object of this invention is to provide a band saw with the saw blade supporting frame offset to the work table to enable cutting of longer stock by the saw blade.

Other objects, features and advantages of the invention will more fully become apparent in view of the following detailed description of the drawings which by way of preferred examples only, illustrates several forms of my invention.

On the drawings:

FIGURE 4 is a side elevation of my band saw machine showing the band saw pivoted from generally a vertical position to an inclined generally horizontal cutting position;

FIGURE 5 is an enlarged fragmentary cross-sectional view showing the details of how the band saw is pivoted and the self-feeding mechanism;

FIGURE 6 is a plan view similar to FIGURE 3 of a modified band saw machine.

As shown on the drawings:

Figure 1:
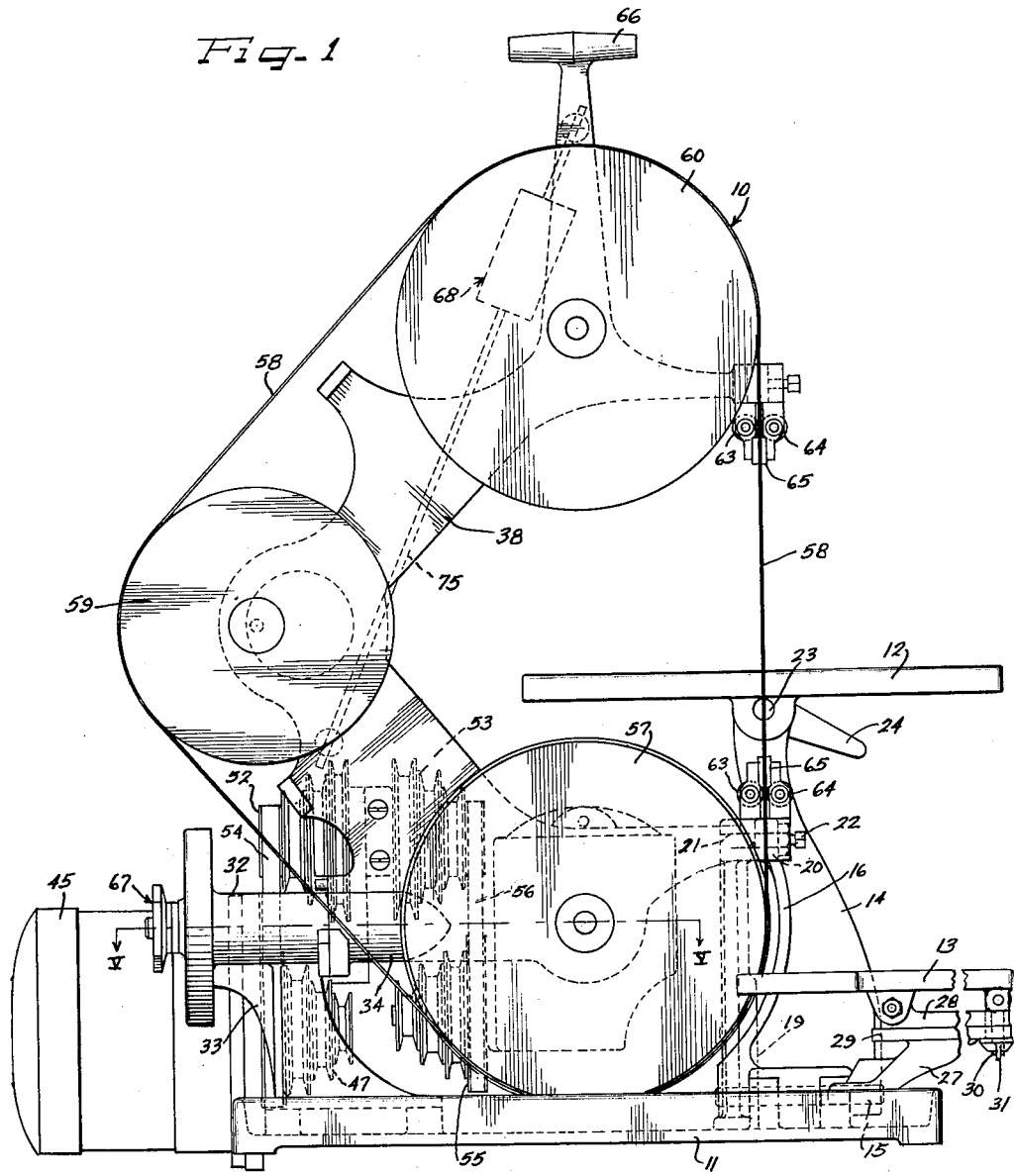
FIGURE 1 is a side elevation of my band saw machine with the elements shown for purposes of clarity in full and dotted lines.
Figure 2:
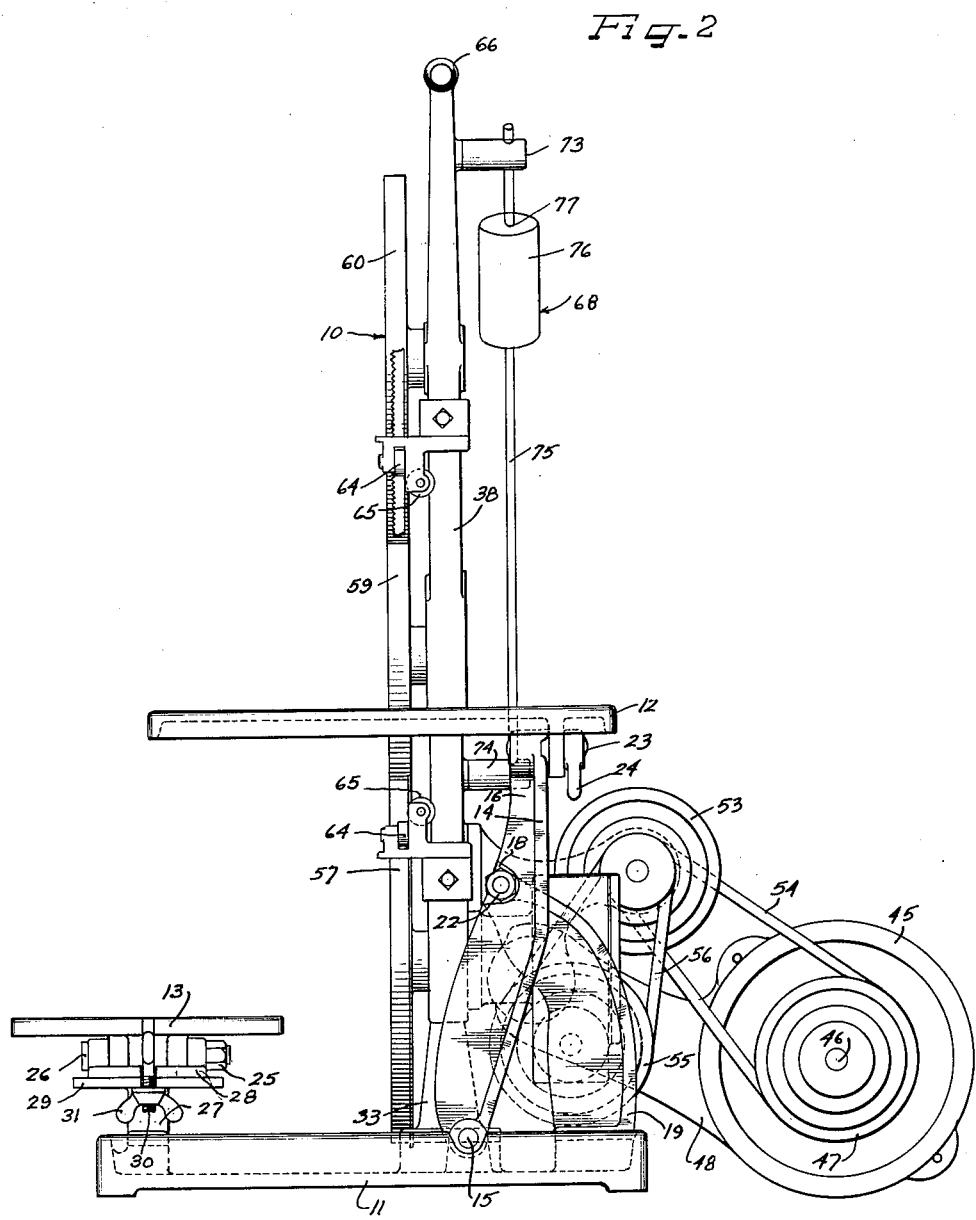
FIGURE 2 is a front elevation of my band saw machine.

The reference numeral 10 indicates generally my band saw machine. The machine has a base 11 which supports upper and lower work tables 12 and 13. Work table 12 has an arm 14 which is pivotally connected at 15 to the base. The arm 14 has an angular arm flange 16 having a notched portion 17 defining a notch or seat 18 (FIGURE 4). Carried on the base 11 and spaced from the arm 14 is an upstanding support 19. A free end of the support 19 has a boss 20 provided with a threaded bore 21 (FIGURE 1) in which a headed screw 22 is engaged in the bore 21. When the table 12 is in a vertical or upstanding position, the screw 22 is seated in the notch 18 of the arm 14. By tightening the screw 22 against the flange 16, the work table 12, the arm 14 and the support 19 may be secured together. It is in this manner the arm 14 and support 19 support the work table 12 rigidly in an upright position. The work table 12 is pivotally carried at 23 on the arm 14 and a latch 24, which may be a cam type of latch, is utilized between the arm 14 and the work table 12 to maintain the work table 12 in adjustable assembly. Spaced opposite the work table 12 and also connected to the base 11 is the work table 13. The table 13 is secured by nut 25 and bolt 26 in adjustable relation to the base through a connecting arm 27. More specifically, the work table 13 has super-imposed plates 28 and 29 with the plate 29 being rigidly carried by arm 27. The plate 29 and the table 13 are pivotally connected to the plate 28 by means of the nut 25 and bolt 26. A swingable bolt 30 is carried by table 13 and is adapted to extend through the plates 28 and 29. By this construction, the table 13 and the plates 28 and 29 pivot relative to one another. The table 13 may be vertically inclined by releasing wing nut 31 from the elongated bolt 30 (FIGURE 1) and moving the table 13 on its pivot pin 26. Ordinarily, the table 13 lies in a horizontal position with the table 12 being considerably elevated with respect thereto.

The band saw machine includes a block 32 fixedly connected to the base 11 by bracket 33. Opposite the fixed block 32 is a rotary block 34 the latter of which is rotatably connected to the fixed block 32 by pin 35 (FIGURE 5); the pin 35 being keyed at 36 to the block 34 and rotatable within bore 37 of the block 33. The block or boss 34 extends from a U-shaped frame 38 (FIGURE 5) to which is connected a gear and bearing housing 39. Housed within the housing 39 is a drive shaft 40 which is supported by bearings 41 and the bearings may be of any suitable construction.

Keyed at 42 to the shaft 40 is a worm wheel 43 which is turned by a worm gear 44. The worm gear is turned as a result of a transfer of energy from a prime mover 45 such as a motor. The motor has a shaft 46 which carries a first stepped multi-grooved pulley 47.

The motor 45 has a bracket 48 (FIGURE 3) secured thereto and which bracket is in turn connected to a boss 49 on a support 50 which is carried and supported by the pivotal block 34. The support 50 extends beyond the boss 49 and carries the spindle 51. Carried on opposite ends of the spindle are stepped multi-grooved pulleys 52 and 53. The pulley 52 is spaced opposite the pulley 47 with a belt 54 connecting them together. The pulley 53 is spaced opposite stepped multi-grooved pulley 55 and a belt 56 connects them together. As will be best seen in FIGURE 5, the pulley 55 is directly connected to the worm gear 44 which causes the drive shaft 40 to move through the speed reducers worm wheel 43.

The drive shaft 40 drives guide roll 57 upon which is carried under tension saw blade 58; the guide roll 57 along with the other guide rolls 59 and 60 are supported on the frame 38. The rolls 59 and 60 freely revolve on pins 61 and 62 depending from frame 38 (FIGURE 4).

In summary, upon actuation of motor drive shaft 46, the endless saw blade is caused to rotate upon its guide rolls. Conventional upper and lower sets of adjustable guide rollers 63, 64 and 65 have been provided on the frame 38 and are adapted to be positioned on opposite sides of the work tables 12 and 13 depending on which table is being used. The speed of the saw blade may be varied through adjusting the belts on the multi-grooved pulleys aforementioned.

To change the band saw machine from a vertical type cutting unit to a generally horizontal adjustable self-feeding type unit, the adjustable screw 22 must be loosened and the work table swung laterally away from the frame 38 (FIGURE 4) upon its pivot 15. Then upon grasping handle 66 the frame 38 and everything carried thereby including the motor, pulleys, etc. may be swung on the frame pivot pin 35 generally at right angles away from the pivoted table 12 into a generally horizontal position to overlie the work table 13.

To permit adjustable self-feeding of the saw blade 58 into material to be cut on the work table 13, when in a horizontal position, a brake 67 comprising lockout means and an adjustable weight 68 are provided to attain this end.

Depending from and rigidly fixed to pin 35 (FIGURE 5) is a threaded extension 69 which extends outwardly and away from turned flange 70 on the fixed block 32. A rotatable cap 71 is screwed on to the extension 69. The cap 17 lies in face to face relation to flange 70 and a brake lining 72 is disposed therebetween. The brake lining 72 may be affixed to the cap 71. Disposed outwardly of the cap 71 is a washer 73' and a nut 74' which holds the cap 71 in abutting relation against the brake lining 72. Adjustment of the tension between the rotatable cap 71 and the flange 70 and the lining 72 may be brought about by turning the nut 74'. As the pin 35 rotates, the cap 71 and the lining 72 frictionally engage the fixed block 32. By manipulation of this fricitional means, the saw blade 58 and its supporting swingable structure may be initially locked in a vertical position and thereafter manually moved to positions inclined to the vertical saw blade position and the swingable structure will remain in this position unless manually moved or until the adjustable weight or feeder has been brought into operation.

As is shown in FIGURE 4, the weight 68 is secured to the top of or to one side of the frame 38. To this end, blocks 73 and 74 are provided and separated from one another and connected together by a rod 75 with the assembly being carried upon the frame 38. Carried on the rod 75 is a weight 76 having a hole 77 in which the rod 75 is lodged in adjustable slidable frictional engagement therewith. By this means, the horizontal cutting operation may be automatic and may be adjusted merely by sliding the weight 76 in a predetermined position on its rod 75. Also, the weight 76 acts to hold the saw blade 58 against the work piece to be cut.

To return the horizontal saw blade 58 to a vertical position, all that need be done is to swing the frame 38 upon its pivot 35 into a vertical position. By then swinging the work table 12 into a vertical position and tightening the nut 22 against the notched portion 17, the saw blade 58 is then restored to a vertical cutting position.

In FIGURE 6 is shown a modified form of my invention in which a band saw machine 80 is provided. Since the construction of the band saw machine 80 is substantially the same as in the first form of my invention, primed numerals have been utilized to identify identical elements.

Figure 3:
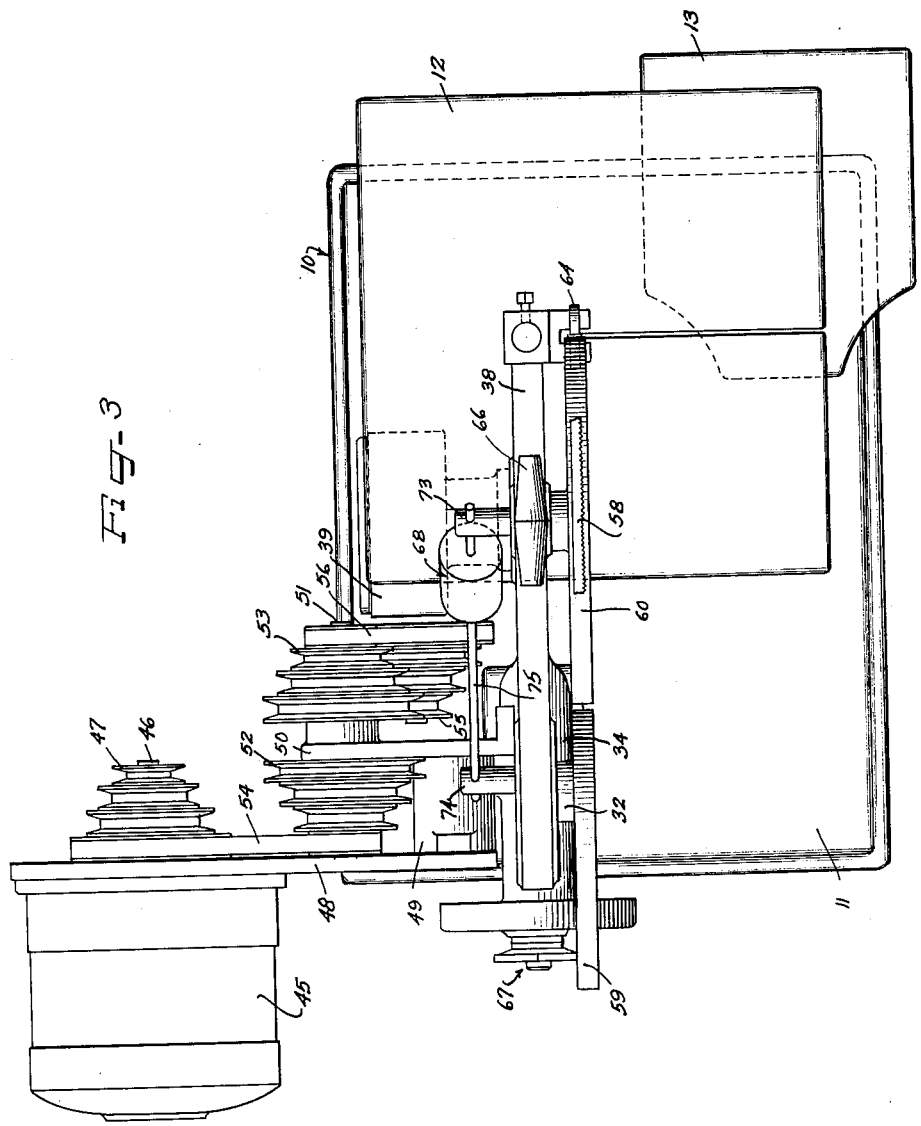
FIGURE 3 is a plan view of my band saw machine.

In this form of my invention (FIGURE 6), fixed block 32' and its supporting bracket (not shown) are disposed at one of the corners of the base 11 as opposed to being centered on the base as in the first form of my invention (FIGURE 3). Also, the junction between the rotary block or boss 34' and the frame 38' is offset or angled 20°. In other words, the frame 38' is inclined at a 20° angle relative to the fixed block 32'. The work tables 12' and 13' are maintained in approximately the same position relative to the base 11 as in the first form of my invention. By this construction, considerably longer pieces of stock may be fed into the saw blade 58' for a cross-cut than in the first form of my invention since the offset or angled frame 38' will be removed sufficiently from the cutting area to avoid interfering with the cutting operation.

In view of the foregoing, it will now be appreciated how I have provided a portable power band saw machine having a capacity to saw chrome steel, tool steel, cold rolled steel, cast iron in one range of four speeds and likewise to cut wood, plastics, paper and other soft metals in another range of four speeds. Further, the aforesaid cutting operations may be effectuated in either a vertical or a horizontal cutting position.

The tables 12 and 13 of both of my machines may of course, support a wide variety of fixtures such as jigs, angle plates, V-blocks and the like.

While three rolls or wheels have been here illustrated to support the cutting blade 58, it will be appreciated two or more wheels could be used also.

The band saw machines 10 and 80 each may be moved from a vertical position to an inclined position by grasping the handle 66 and causing the frame 38 and the saw blade 50 to be moved. It is in this way the saw blade 58 may be moved back and forth relative to the work table 12. Thus, when the work pieces or stock to be cut are fastened to the work table 12, hand feeding of the stock into the saw blade is unnecessary thus providing a safety feature which is highly important since the possibility of mistakes and accidents may be thereby reduced.

It will be understood that modifications and variations may be effected without departing from the scope of the novel concepts of the present invention, but it is understood that this application is to be limited only by the scope of the appended claims.

I claim as my invention:

1. A band saw machine including a pivotal frame assembly pivotally mounted on a base, the frame assembly including a pivotal frame having blade guides mounted on one side and a band saw blade carried on said blade guides, a base block mounted on the base and including an internal bore, a pivot pin attached to the frame and extending into the bore and having a threaded end extended outwardly of said block at one of its sides, the pivotal frame assembly being pivotally adjustable on its pivot pin with respect to said base from a generally vertical position into a position inclined to this vertical position so that the operative portion of the saw blade is moved in its own plane, a locking device comprising a releasable and adjustable friction type brake cooperable with the pivot pin for maintaining the pivotal frame in this vertical position and adjustable for controlling the pivoting of the frame assembly and the band saw blade from a vertical position to inclined positions so that the band saw blade may be self fed against the stock to be cut in a controlled manner, said brake including a brake lining bearing against one end of said block, a brake cap mounted on said pivot pin holding said brake lining against said block, and a nut mounted on said threaded end of said pivot pin for urging the cap and the brake lining against the block for controlling the pivoting of the pivot pin and the frame with respect to said base block.

2. A band saw machine including a pivotal frame assembly pivotally mounted on a base, the frame assembly including a pivotal frame having blade guides mounted on one side and a band saw blade carried on said blade guides, a base block mounted on the base and including an internal bore, a pivot pin attached to the pivotal frame and extending into the bore and having a threaded end extended outwardly of said block at one of its sides, the frame assembly being pivotally adjustable on its pivot pin with respect to said base from a generally vertical position into a position inclined to this vertical position so that the operative portion of the saw blade is moved in its own plane, a locking device comprising a releasable and adjustable friction type brake cooperable with the pivot pin for maintaining the pivotal frame in this vertical position and adjustable for controlling the pivoting of the frame assembly and the band saw blade from a vertical position to inclined positions so that the band saw blade may be self fed against the stock to be cut in a controlled manner, said brake including a brake lining bearing against one end of said block, a brake cap mounted on said pivot pin holding said brake lining against said block, a nut mounted on said threaded end of said pivot pin for urging the cap and the brake lining against the block for controlling the pivoting of the pivot pin and the frame with respect to said base block, and counterbalance means mounted on an opposite side of said frame including a rod and a weight slidably mounted on the rod to overcome said brake so the pressures of the band saw blade against the stock can be adjusted and so the blade can be self fed against the stock to be cut.

3. A band saw machine as claimed in claim 2 which includes upper and lower work tables mounted on opposite sides of said base, the upper table being cooperable with the saw blade when it is in a generally vertical position and the other lower table being cooperable with the saw blade when it is in its inclined position, the upper work table being mounted on an arm pivotally secured to said base, and releasable arm attachment means for fixing said work table in an erect position and releasable to enable the upper work table to be swung on its pivot in an arc away from the saw blade and away from the lower table to avoid interference therewith when the saw blade carried by the pivotable frame is pivoted into a cutting position inclined to the generally vertical position, the pivot of the upper work table being coaxial of the frame pivot.

References Cited in the file of this patent

UNITED STATES PATENTS

| | | |
|---|---|---|
| 202,767 | Swank et al. | Apr. 23, 1878 |
| 1,066,498 | Hunter | July 8, 1913 |
| 1,233,430 | Williamson | July 17, 1917 |
| 1,421,107 | Stowell | June 27, 1922 |
| 1,453,609 | Stowell | May 1, 1923 |
| 1,721,722 | Wells | July 23, 1929 |
| 1,867,269 | Kimble | July 12, 1932 |
| 2,181,128 | Hack | Nov. 28, 1939 |
| 2,630,622 | Beck | Mar. 10, 1953 |
| 2,705,510 | Stocke | Apr. 5, 1955 |
| 2,719,690 | Zucker | Oct. 4, 1955 |
| 2,892,476 | Lapsley | June 30, 1959 |

FOREIGN PATENTS

| | | |
|---|---|---|
| 800,123 | France | Apr. 20, 1936 |
| 1,100,990 | France | Apr. 13, 1955 |